Patented July 27, 1926.

1,594,191

UNITED STATES PATENT OFFICE.

WALLACE APPLETON BEATTY, OF NEW YORK, N. Y., ASSIGNOR TO BEECH-NUT PACKING COMPANY, OF BROOKLYN, NEW YORK, A CORPORATION OF NEW YORK.

JELUTONG PRODUCT AND METHOD OF MAKING THE SAME.

No Drawing. Application filed December 30, 1924. Serial No. 758,878.

This invention relates to a new Jelutong product and to the method of making the same from Jelutong latex.

Jelutong (or Pontianak) has been extensively used in the chewing gum industry, and also in the rubber industry. It has always been considered a gum that oxidized very quickly, and that could not be shipped except in a very moist state, containing around 45 to 50% moisture in the pressed material, and as high as 70% in the unpressed material. When this moisture dried out the gum oxidized to such an extent that the rubber qualities entirely disappeared, and there was nothing left but resin, and, in order to prevent or reduce this objectionable oxidization, the product has been produced and shipped in a moist state. The resin produced by the oxidation, moreover, has an extremely bitter taste, which prevents the use of the product for purposes where taste is a vital quality. The pronounced tendency of Jelutong, as heretofore produced, to oxidize has resulted in the loss of enormous quantities of this material while the use in chewing gum of previously oxidized material and of material that rapidly oxidized when made into the chewing gum, has been a matter of serious concern in the chewing gum industry, through the deterioration or loss of the chewing gum in which the Jelutong has been used.

The presence of a large amount of moisture in the Jelutong or Pontianak, while useful in preventing or retarding oxidation, nevertheless promotes or permits decomposition of other constituents of the crude product, so that the product has a characteristic odor similar to that of Limburger cheese. In this crude condition, the product also has an extremely disagreeable taste. These objectionable properties of the crude product have nevertheless been tolerated and accepted as characteristic.

In order to make the crude product available for commercial use, especially in the chewing gum industry, it has been necessary to subject it to refining processes which are expensive, and even the refined product does not have a neutral flavor. In spite of the objectionable properties of the crude product, and the difficulty and expense of refining it, the product is used to the extent of many million pounds a year in the chewing gum industry. Formerly, when the price of rubber was extremely high, large amounts of Jelutong were used in the rubber industry; but since the introduction of plantation rubber at a very moderate price, it has not been economical, except for special purposes, to use Jelutong in the rubber industry; and it has found an increased and extensive application in the manufacture of chewing gum, being at present used in larger amounts in the manufacture of chewing gum than chicle.

In the production of crude Jelutong, according to methods customarily employed, the Jelutong latex is subjected to coagulation by means of various coagulants, such as kerosene, calcium sulfate, copper sulfate, acetic acid, etc., and the rubber and resin are in this way separated from most of the other constituents of the latex. Small amounts of other constituents, however, remain in the coagulated product, together with a considerable amount of moisture, and these other constituents, such as nitrogenous constituents and sugars, are doubtless responsible, through decomposition, for the characteristic odor and taste of the crude product. A large amount of moisture is intentionally left in the product, as above pointed out, in order to protect the crude product as much as possible from objectionable oxidation.

According to the present invention, the objectionable characteristics and properties of the crude Jelutong as heretofore produced are avoided, and a new and greatly superior Jelutong product is produced in greatly increased yields from the Jelutong latex Instead of subjecting the Jelutong latex to coagulation to separate the rubber and resin from other constituents, as in processes heretofore commonly practiced, the Jelutong latex is, in the process of the present invention, subjected to evaporation, and evaporated to dryness, so that all of the constituents of the latex except volatile constituents are retained in the dried product In this way, a dry product is produced which resists oxidation, and which represents a greatly increased yield of product from the Jelutong latex An extended investigation of the Jelutong latex and of the product produced therefrom by coagulation and by the evaporation process of the present invention has disclosed the fact that the material present in the latex, other than rubber and resin, and from which the rubber and resin are separated by coagulation, will, if retained in the product by evaporation of the entire latex, exert a protective nature against oxidation, such that the resulting dry product is a stable product, free from the objectionable tendency toward oxidation of the present dry crude Jelutong product, particularly in a dried state. The amount of this other material, other than rubber and resin and which is insoluble in benzol, represents about 20 to 25% of the total solids of the Jelutong latex, while the rubber and resin which are soluble in benzol represent around 80 to 75% of the total solid of the latex. By retaining these other constituents in the product, the yield of dry product is accordingly increased by about 1/5 to 1/4 the previous yield of dried material.

The evaporation of the Jelutong latex as a whole, moreover, has the further important advantage, among others, of giving directly a product which can advantageously be used in chewing gum without any further refining treatment.

In carrying out the process of the present invention, the Jelutong latex may be used directly, in a fresh state, and subjected to evaporation or drying to give the dry product. The process can thus advantageously be carried out on the plantation, or in the vicinity of the production of the latex; and the latex can be collected and supplied in a fresh state for use in the process. Suitable precautions should be observed in the collection and transportation of the latex to prevent it from contamination, and the latex should be used while fresh or, if it is kept for any considerable time, proper precaution should be taken to prevent objectionable decomposition, as by the addition of preservatives.

Instead of drying the latex on the plantation, or in the neighborhood of the source of production, it can be suitably preserved and shipped for a considerable distance and subjected to evaporation to dryness in the country of its destination. The Jelutong latex can be suitably preserved, for example, by the use of ammonia alone in small amounts, or by the use of an exceedingly small quantity of caustic soda, or by the use of a small amount of alkali mixed with a very small amount of ammonia. By the use of such preservatives, the latex can be shipped for long distances without objectionable decomposition or coagulation, so that the latex can then be subjected to evaporation or drying and a superior product nevertheless produced. While the specific gravity of the latex varies somewhat, it is about 1.015.

The evaporation or drying of the Jelutong latex can be carried out in various ways. Whatever the method, all of the constituents of the latex are retained in the final product, after the evaporation to dryness. While the evaporation can be carried out at ordinary temperatures, as by the exposure of thin layers of the latex and the use of currents of warm air, the evaporation can best be carried out by drying at a higher temperature, as by the use of heater currents of gas, or direct heating of the latex in suitable receptacles. The latex can thus be evaporated, for example, by spreading the latex out in thin layers, which may be heated or unheated, and by conveying a current of hot air or inert gas over it. The latex may thus be caused to flow on to a slowly rotating drum, which may in internally heated, and the heat of the drum may be relied upon to evaporate the water from the latex, which, after drying is scraped from the drum, or this evaporation can be promoted by the use of currents or blasts of hot gases passing over the thin layers of the latex on the rotating drum. Instead of using a rotating drum, an endless belt can be used, on which the latex is spread out, and the belt can then be passed through heated spaces or brought into contact with a heated current of gas or air.

Instead of spreading out the latex in thin layers for its drying or evaporation, it can be evaporated in steam jacketed kettles provided with stirrers for agitating the latex, and preferably with scrapers which closely scrape the sides of the kettle to prevent any undue heating and caramelization.

A particularly advantageous method of drying the latex is by spraying it or otherwise distributing it in a finely divided state into an atmosphere of heated gases which bring about rapid drying of the particles and the production of a dry pulverulent product. The latex can thus be sprayed through a nozzle into a heated space in which a current of hot products of combustion is passed to carry off the moisture, and the dry material can be collected at the bottom of the apparatus. Or the latex can be allowed to flow on to a rapidly revolving disk which serves to throw off the liquid in a finely divided state into a heated space in which a current of hot air or inert gas is maintained to carry off the moisture.

It will be evident that various methods of drying or evaporation can be used for removing the water from the latex and for giving a dry product, containing the total solids of the latex present therein. This drying should, however, be carried out at such a temperature as not to affect injuriously the resulting product. When the drying is carried out at a high temperature, below that which is injurious to the product, it will have a sweetish caramel taste and odor, or a taste and odor like maple sugar. From the standpoint of yield, the complete evaporation of the latex to dryness gives around 20 pounds of material for every 100 pounds of latex, or about a 20% yield. On the other hand, when the material is coagulated, the yield is only around 15 to 16%. The process of the present invention, accordingly, gives a yield which is around 20 to 25% greater than the yield obtained in the usual way by coagulation and subsequent drying.

The new Jelutong product of the present invention is radically distinguished from the Jelutong product heretofore known. Certain of its distinguishing properties and characteristics have been referred to. It contains the total solids of the Jelutong latex, and represents a much higher yield than the usual crude Jelutong product. The added material which the new product of the present invention contained exerts a protective nature against oxidation and stabilize the product so that it does not readily oxidize and so that it can be kept for long periods of time without objectionable decomposition and without the development of the characteristic and objectionable taste and odor of present day crude Jelutong. The new product, moreover, is directly produced in a refined state such that further refining is unnecessary.

As above stated, the new product has a sweetish caramel or maple sugar taste, and also has an odor like that of maple sugar or caramel. There is a modification in this caramel-like odor and taste depending somewhat upon the type of preserved latex that is used as the source of the product, but the sweet taste and the exceptionally pleasant caramel-like odor are characteristics of the product produced by drying at an elevated temperature. The taste and odor distinguish the new product radically from Jelutong produced according to the usual methods. In fact, the new product of the present invention is in itself a confection both in taste, odor, and other qualities, and, being clean and free from dirt or bark or other usual contaminations, it can be directly used, without refining, for chewing gum manufacture, and forms a particularly valuable product for such use. The product has been found to keep for long periods of time without undergoing objectionable change. Inasmuch as the product can be directly produced in a refined state such that it can be kept for long periods of time, it is possible to ship the product long distances without objectionable deterioration. Furthermore, the product can be shipped in a pure and dry state, thus avoiding large expense for transportation of water, present in crude Jelutong products heretofore known, while the product upon arrival at its destination can be directly used without the present day expense and difficulty of cleaning and refining the product and subsequently drying it before use. In these respects, the product differs radically from Jelutong products heretofore produced, which are maintained moist, and which, when dried, oxidize rapidly.

In chemical compositions, the new product varies somewhat but in general contains around 20 to 25% of benzol-insoluble material, and around 80% to 75% of benzol-soluble material. The composition of the benzol-soluble material varies somewhat but in general is made up of around 75% to 85% of resins, and around 25% to 15% of rubber. The product is therefore radically distinguished from ordinary Jelutong which has only about 1½ to 3% of benzol-insoluble residue which is usually made up for the most part of dirt. Owing to the stability of the product, moreover, the rubber present in the product remains as rubber with little if any oxidation. Whereas, ordinary Jelutong, of the character previously known, and containing on a dry basis around 20% of rubber and 80% of resin, was found to be converted by oxidation into a product that was practically 100% resin, and a product having an extremely bitter taste, and useless for chewing gum manufacture; the rubber content of the new product remains little if any changed on standing, being protected from oxidation. The resin present in the product have quite a high melting point, beginning to soften in the neighborhood of 118° C., and melting completely around 132° C., although the melting point and softening temperature vary somewhat.

The new product has a much tougher nature than the product produced from the same latex by the usual methods of coagulation. This increased toughness, moreover, is retained by the product on standing, or keeping for long periods of time, and makes the product one of increased value for different purposes.

It will thus be seen that the process provides a new method for the treatment of Jelutong latex for the production of a new product therefrom in incresed yield, the process being characterized by the evaporation or drying of the entire latex, so that the dry product contains the total solids of the latex.

It will also be seen that the new product of the present invention represents a materially increased yield of product from the latex, and that the product itself is of a characteristic composition and has characteristic properties which radically distinguish it from known Jelutong products. Instead of containing a very small amount of benzol-insoluble constituents, it contains a large amount, around 20 to 25% of the total product, and these constituents impart stability to the entire product. Instead of being readily oxidizible, with the resulting conversion of rubber into resin and the production of an extremely bitter taste, the new product is resistant to oxidization and does not on keeping produce the extremely bitter taste or undergo the other objectionable decompositions of ordinary Jelutong. Instead of having an objectionable odor and taste, it has a pleasing odor and taste, being sweetish in taste and having a pleasing caramel-like or maple sugar odor and taste. Instead of requiring refining to make it available for chewing gum manufacture, the new product is itself a confection adapted for use directly in chewing gum manufacture, and, because of its composition and its characteristic odor and taste, it imparts to the chewing gum correspondingly desirable properties. When used for chewing gum, its toughness and rubber-like characteristics enable it to be used to impart stiffness to softer gum, or the product itself can be softened by the admixture of softener constituents or fluxes during the chewing gum process of manufacture. The product is, however, useful for other purposes, such as in the rubber industry.

The present invention thus provides a new natural product, without the addition of other materials, which can be used directly in chewing gum manufacture without refining, and which in odor and flavor has the qualities of a confection and which forms a desirable ingredient, because of its flavor and odor, for chewing gum. Owing to the remarkable resistance of the product to oxidization, and the preservation of its characteristic odor and taste, the life of the chewing gum into which it is incorporated is correspondingly prolonged, and danger of spoilage through oxidization is correspondingly prevented or reduced. The increased yield of the product from the latex results in a greatly increased production of available product from the same amount of latex, thus conserving and extending the supply of the raw material, which is rapidly disappearing.

I claim:

1. The method of producing a new Jelutong product, which comprises subjecting Jelutong latex to evaporation and thereby obtaining a dry product representing substantially the total solids of the latex.

2. The method of producing a new Jelutong product, which comprises preserving Jelutong latex and preventing coagulation thereof, and subjecting the preserved and uncoagulated latex to evaporation to remove the water therefrom and leave behind substantially the total solids of the latex.

3. The method of producing a new Jelutong product, which comprises subjecting Jelutong latex to evaporation at an elevated temperature and thereby producing a dry solid product containing substantially the total solids of the latex and having a characteristic caramel-like odor and taste.

4. The method of producing a new Jelutong product, which comprises subjecting Jelutong latex containing a small amount of a preservative compound of an alkaline major to a drying operation to remove water therefrom, thereby obtaining a dry product containing substantially the total solids of the latex.

5. A new Jelutong product in a dry state containing substantially the total solids of Jelutong latex.

6. A new Jelutong product in a dry state containing substantially the total solids of Jelutong latex, said product having a caramel-like taste and odor.

7. A new Jelutong product containing in a dry state substantially the total solids of Jelutong latex, said product containing about 20 to 25% of benzol-insoluble material and about 80 to 75% of benzol-soluble material, the composition of the benzol-soluble material being about 75% to 85% of resin and about 25% to 15% of rubber.

8. A new Jelutong product in a dry state, which can be kept for long periods of time without objectionable oxidation.

9. A new Jelutong product in a dry state, representing about 20% of the total weight of the Jelutong latex from which the product is produced.

In testimony whereof I affix my signature.

WALLACE APPLETON BEATTY.